(12) United States Patent
Takahashi et al.

(10) Patent No.: US 9,384,557 B2
(45) Date of Patent: Jul. 5, 2016

(54) INFORMATION PROCESSING DEVICE, IMAGE MODIFICATION METHOD, AND COMPUTER PROGRAM PRODUCT

(71) Applicant: KABUSHIKI KAISHA TOSHIBA, Tokyo (JP)

(72) Inventors: Shihomi Takahashi, Kanagawa (JP); Tomoyuki Shibata, Kanagawa (JP); Kaoru Suzuki, Kanagawa (JP); Yojiro Tonouchi, Tokyo (JP); Kazunori Imoto, Kanagawa (JP); Isao Mihara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/845,589

(22) Filed: Sep. 4, 2015

(65) Prior Publication Data

US 2016/0078631 A1    Mar. 17, 2016

(30) Foreign Application Priority Data

Sep. 17, 2014   (JP) ................................ 2014-189286

(51) Int. Cl.
| | | |
|---|---|---|
| *G06K 9/00* | (2006.01) | |
| *G06T 7/00* | (2006.01) | |
| *G06K 9/18* | (2006.01) | |

(52) U.S. Cl.
CPC ................ *G06T 7/0081* (2013.01); *G06K 9/18* (2013.01)

(58) Field of Classification Search
None
See application file for complete search history.

(56) References Cited

U.S. PATENT DOCUMENTS

| | | | | |
|---|---|---|---|---|
| 7,899,258 | B2* | 3/2011 | Liu | G06K 9/38 382/164 |
| 8,644,602 | B2* | 2/2014 | Chen | H04N 1/58 358/515 |
| 2004/0027594 | A1* | 2/2004 | Suzuki | G06T 5/003 358/1.2 |

FOREIGN PATENT DOCUMENTS

| | | |
|---|---|---|
| JP | 2000-066658 | 3/2000 |
| JP | 2000-085188 | 3/2000 |
| JP | 2000-152125 | 5/2000 |
| JP | 2007-274629 | 10/2007 |

(Continued)

OTHER PUBLICATIONS

Lucas, B.D. et al., "An Iterative Image Registration Technique with an Application to Stereo Vision," Proceedings DARPA Image Understanding Workshop, Apr. 1981, pp. 121-130.

(Continued)

*Primary Examiner* — Eueng-Nan Yeh
(74) *Attorney, Agent, or Firm* — Nixon & Vanderhye, P.C.

(57) ABSTRACT

According to an embodiment, an information processing device includes: a first division unit divides an image into a text containing region and a background region other than the text containing region; a second division unit divides a text containing region into a character region constituted by lines forming characters and a character background region other than the character region; a calculator calculates a first representative value of an attribute of the character region, a second representative value of the attribute of the character background region, and a third representative value of the attribute of the background region; a modification unit makes modification so that a first difference based on the first and third representative values, a second difference based on the first and second representative values, and a third difference based on the second and third representative values become larger; and an output unit outputs a modified image.

12 Claims, 15 Drawing Sheets

(56) References Cited

FOREIGN PATENT DOCUMENTS

| JP | 2007-280166 | 10/2007 |
|---|---|---|
| JP | 2012-079076 | 4/2012 |

OTHER PUBLICATIONS

Itti, L. et al. "A Model of Saliency-Based Visual Attention for Rapid Scene Analysis," IEEE Transactions on Pattern Analysis and Machine Intelligence, vol. 20, No. 11, Nov. 1998, pp. 1254-1259.

Neumann, L, et al., "Text Localization in Real-world Images Using Efficiently Pruned Exhaustive Search," 2011 International Conference on Document Analysis and Recognition, pp. 687-691, (published before this application Sep. 2015).

Lee, J-J., et al., "AdaBoost for Text Detection in Natural Scene," 2011 International Conference on Document Analysis and Recognition, pp. 429-434, (published before this application Sep. 2015).

* cited by examiner

FIG.6

| PATTERN / BACK-GROUND | RED | ORANGE | ORANGE-YELLOW | YELLOW | YELLOW-GREEN | GREEN | GREEN-BLUE | BLUE | BLUE-VIOLET | VIOLET | RED-VIOLET |
|---|---|---|---|---|---|---|---|---|---|---|---|
| RED | 0 | 2.9 | 8.0 | 8.7 | 3.8 | 1.2 | 2.3 | 2.9 | 3.0 | 3.8 | 1.2 |
| ORANGE | 3.0 | 0 | 5.0 | 5.8 | 0.9 | 4.2 | 5.4 | 6.0 | 5.7 | 6.8 | 4.2 |
| ORANGE-YELLOW | 8.2 | 5.0 | 0 | 0.6 | 4.4 | 9.4 | 10.5 | 11.4 | 11.4 | 12.0 | 9.5 |
| YELLOW | 8.8 | 5.0 | 0.7 | 0 | 5.0 | 9.9 | 11.1 | 11.5 | 11.5 | 12.5 | 9.0 |
| YELLOW-GREEN | 3.8 | 0.8 | 3.8 | 5.0 | 0 | 5.0 | 6.3 | 6.6 | 6.5 | 7.6 | 5.2 |
| GREEN | 1.2 | 4.2 | 9.3 | 10.0 | 5.0 | 0 | 1.3 | 2.0 | 2.0 | 2.5 | 2.2 |
| GREEN-BLUE | 2.4 | 5.4 | 10.6 | 11.1 | 6.3 | 1.2 | 0 | 0.5 | 0.6 | 1.5 | 1.0 |
| BLUE | 3.0 | 6.0 | 11.2 | 11.8 | 6.8 | 2.0 | 0.5 | 0 | 0.2 | 0.8 | 1.8 |
| BLUE-VIOLET | 3.0 | 6.0 | 11.2 | 11.9 | 6.8 | 1.8 | 1.3 | 0.2 | 0 | 0.8 | 1.9 |
| VIOLET | 3.6 | 6.6 | 11.8 | 12.7 | 7.4 | 2.8 | 1.2 | 0.6 | 0.7 | 0 | 2.4 |
| RED-VIOLET | 1.4 | 4.2 | 9.4 | 10.0 | 5.2 | 2.7 | 0.5 | 1.8 | 1.8 | 2.5 | 0 |

FIG.12

```
Cafe

TODAY'S SPECIAL

BLUE MOUNTAIN          600 yen

ORIGINAL BLEND         450 yen

CAFFE MOCHA            500 yen
```

FIG.13

- Cafe
- TODAY'S SPECIAL — 312
- BLUE MOUNTAIN — 311                600 yen
- ORIGINAL BLEND                      450 yen
- CAFFE MOCHA                         500 yen

INFORMATION PROCESSING DEVICE, IMAGE MODIFICATION METHOD, AND COMPUTER PROGRAM PRODUCT

CROSS-REFERENCE TO RELATED APPLICATIONS

This application is based upon and claims the benefit of priority from Japanese Patent Application No. 2014-189286, filed on Sep. 17, 2014; the entire contents of which are incorporated herein by reference.

FIELD

Embodiments described herein relate generally to an information processing device, an image modification method, and a computer program product.

BACKGROUND

In related art, technologies for displaying a cursor on an image including a text containing region containing characters and moving the cursor to the text containing region to draw a user's attention to the text containing region have been known.

With the technologies of the related art mentioned above, however, attention to a text in an image is drawn indirectly, which makes the user's recognition of the text slower than a case where attention to a text in an image is drawn directly.

BRIEF DESCRIPTION OF THE DRAWINGS

FIG. 6 is a table illustrating an example of a visual recognition distance table according to the first embodiment;

FIG. 12 is an explanatory diagram of an example of a technique for determining whether or not a line is contained in the periphery of a long side of a circumscribing rectangle of a character region according to a modified example 7;

FIG. 13 is an explanatory diagram of the example of the technique for determining whether or not a line is contained in the periphery of a long side of a circumscribing rectangle of a character region according to the modified example 7;

DETAILED DESCRIPTION

According to an embodiment, an information processing device includes an acquisition unit, a first division unit, a second division unit, a calculator, a modification unit, and an output unit. The acquisition unit acquires an image. The first division unit divides the image into a text containing region containing one or more characters and a background region other than the text containing region. The second division unit divides the text containing region into a character region constituted by lines forming the characters and a character background region other than the character region. The calculator calculates a first representative value of a predetermined attribute of the character region, a second representative value of the predetermined attribute of the character background region, and a third representative value of the predetermined attribute of the background region. The modification unit modifies at least one of the first representative value, the second representative value, and the third representative value in such a way that a first difference based on the first representative value and the third representative value, a second difference based on the first representative value and the second representative value, and a third difference based on the second representative value and the third representative value become larger. The output unit outputs a modified image obtained by changing the value of the predetermined attribute of the character region to a modified first representative value when the first representative value is modified, changing the value of the predetermined attribute of the character background region to a modified second representative value when the second representative value is modified, or changing the value of the predetermined attribute of the background region to a modified third representative value when the third representative value is modified.

Embodiments will be described below in detail with reference to the accompanying drawings.

First Embodiment

Figure 1:
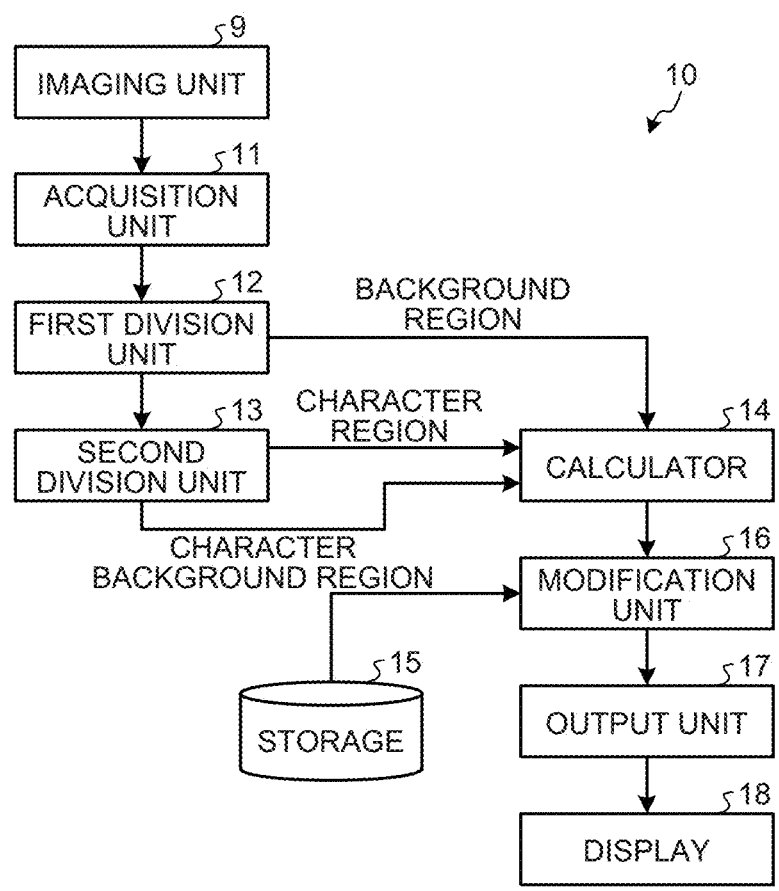
FIG. 1 is a configuration diagram illustrating an example of an information processing device according to a first embodiment.

FIG. 1 is a configuration diagram illustrating an example of an information processing device 10 according to a first embodiment. As illustrated in FIG. 1, the information processing device 10 includes an imaging unit 9, an acquisition unit 11, a first division unit 12, a second division unit 13, a calculator 14, a storage unit 15, a modification unit 16, an output unit 17, and a display unit 18.

The information processing device 10 is assumed to be an eyewear-type wearable terminal in the first embodiment, but may alternatively be a wearable terminal other than eyewear-based terminals, a smart phone, a tablet terminal, a personal computer (PC), or the like.

The imaging unit 9 can be constituted by an imager having a charge coupled device (CCD) or a complementary metal-oxide semiconductor (CMOS), for example, as an image sensor.

The acquisition unit 11, the first division unit 12, the second division unit 13, the calculator 14, the modification unit 16, and the output unit 17 may be implemented by causing a processing device such as a central processing unit (CPU) to execute programs, that is, by software, may be implemented by hardware such as integrated circuits (ICs), or may be implemented by a combination of software and hardware.

The storage unit 15 can be constituted by a storage device, which can magnetically, optically, or electrically store information, such as a hard disk drive (HDD), a solid state drive (SSD), a memory card, an optical disk, a random access memory (RAM), or a read only memory (ROM), for example.

The display unit 18 can be constituted by a display device such as a liquid crystal display or a touch panel display, for example.

The imaging unit 9 takes images. In the first embodiment, since the information processing device 10 is assumed to be an eyewear-type wearable terminal, the imaging unit 9 takes an image that is visually recognized by a user through the information processing device 10.

The acquisition unit 11 acquires the image taken by the imaging unit 9.

The first division unit 12 divides the image acquired by the acquisition unit 11 into a text containing region containing one or more characters and a background region other than the text containing region.

Note that the number of text containing regions depends on the image acquired by the acquisition unit 11. Thus, when one text containing region is contained in the image acquired by the acquisition unit 11, the first division unit 12 divides one text containing region from the image, or when multiple text containing regions are contained in the image acquired by the acquisition unit 11, the first division unit 12 divides multiple text containing regions from the image.

Specifically, the first division unit 12 detects a region, in which one or more characters are captured, from the image acquired by the acquisition unit 11, extracts a region circumscribing the detected region from the image, and sets the extracted region to be a text containing region and the non-extracted region to be a background region.

Figure 2:
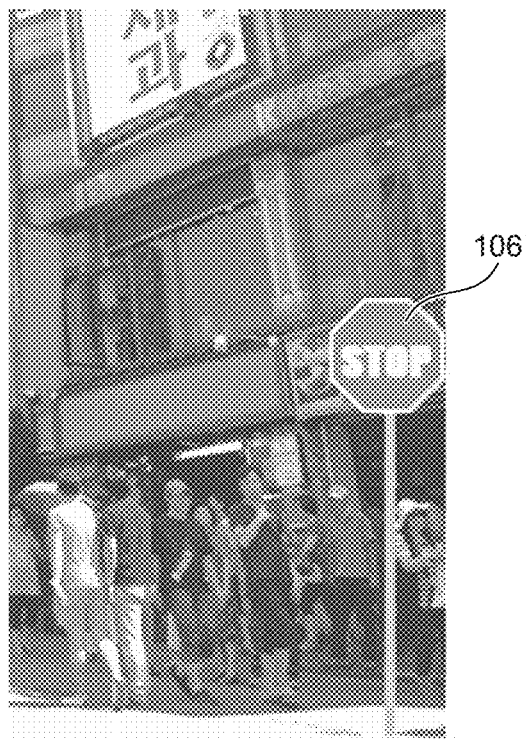
FIG. 2 is an explanatory drawing of an example of a text containing region and a background region according to the first embodiment.

FIG. 2 is an explanatory drawing of an example of a text containing region and a background region according to the first embodiment. In the example illustrated in FIG. 2, an octagonal region containing a text "STOP" is a text containing region 106, and the region other than the text containing region 106 is a background region. Although a region containing Hangul characters at the top of the image is also actually a text containing region, the description thereof will not be provided herein but the region will be assumed to be part of the background region.

Note that a known technique may be used for the technique for detecting a region, in which one or more characters are captured, from an image.

Figure 3:
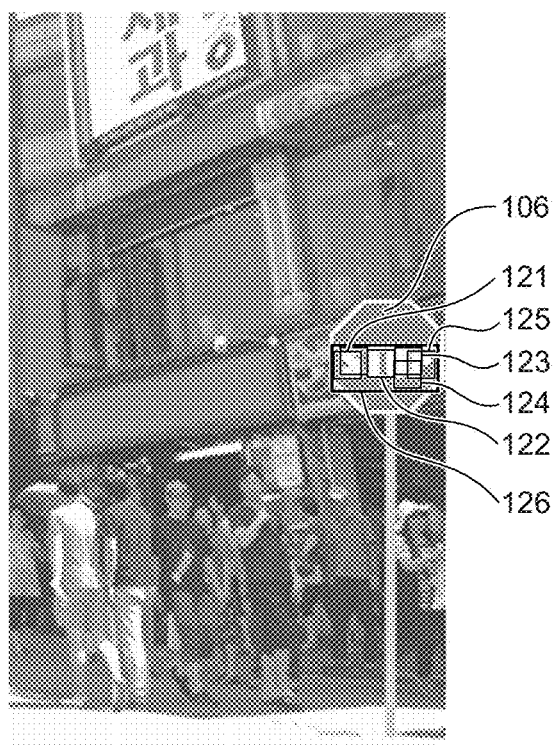
FIG. 3 is an explanatory drawing of an example of a known technique for detecting a region, in which one or more characters are captured, from an image.

FIG. 3 is an explanatory drawing of an example of a known technique for detecting a region, in which one or more characters are captured, from an image. In the example illustrated in FIG. 3, a region 126 in which one or more characters are captured is detected from the image illustrated in FIG. 2, by extracting character components 121 to 125 (one or more successive pixels) constituting the whole or part of the characters from the image, selecting character components estimated to be contained in the same character string from the extracted character components 121 to 125 (the character components 121 to 125 are selected herein), and acquiring information on the direction and the height of the character string on the basis of the selected character components 121 to 125 (for details, refer to JP-A 2005-309771 (KOKAI), for example). Note that the region 126 may be set to be a text containing region.

Figure 4:
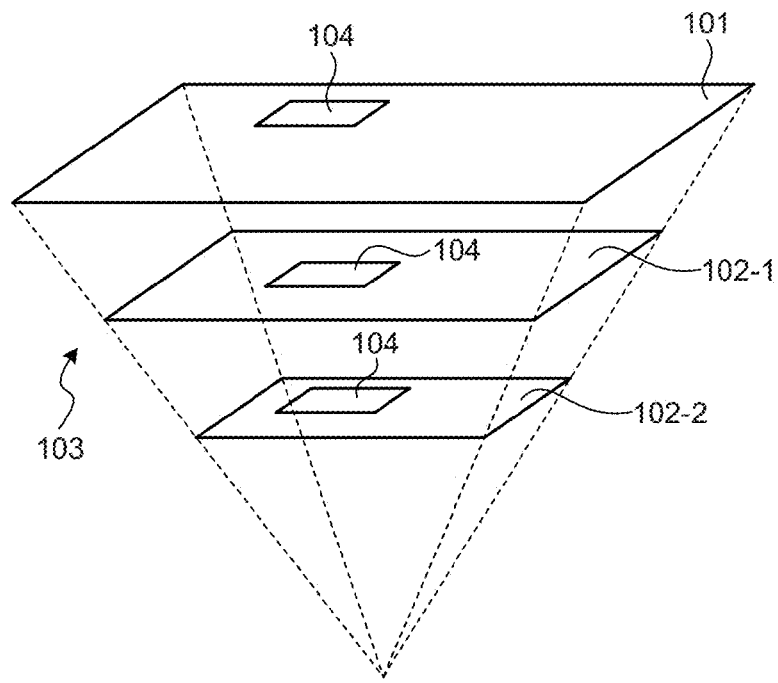
FIG. 4 is an explanatory diagram of an example of a known technique for extracting character components from an image.

FIG. 4 is an explanatory diagram of an example of a known technique for extracting character components from an image. In the example illustrated in FIG. 4, an image 101 is gradually reduced in size at a constant ratio r (where 0<r<1), so that one or more resized images 102-1 to 102-2 are generated, the image 101 and the resized images 102-1 to 102-2 are arranged vertically in such a manner that the centers thereof are aligned, so that a resolution pyramid image 103 is obtained, and corresponding parts in the image 101 and the resized images 102-1 to 102-2 included in the resolution pyramid image 103 are cut out by detection windows 104 having a predetermined size, so that three partial images are generated. The three partial images are then each checked using a character detection dictionary that has learned character images and non-character images in advance, and each partial image is extracted as a character component if the partial image has a score indicating the likelihood of being a character exceeding a threshold for extracting a character component. The score indicating the likelihood of being a character can be obtained by a known technique such as pattern recognition using the subspace method, the support vector machine, or the like.

The second division unit 13 divides a text containing region obtained by the division by the first division unit 12 into a character region constituted by lines forming a character and a character background region other than the character region.

Figure 5:
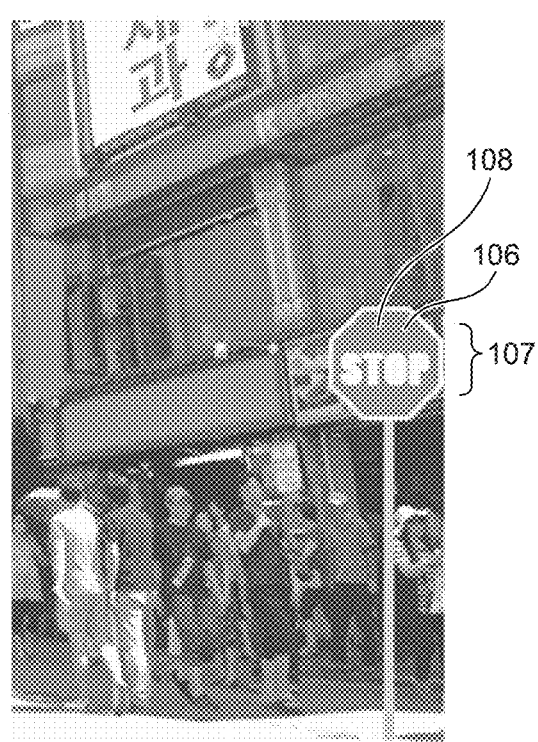
FIG. 5 is an explanatory drawing of an example of a character region and a character background region according to the first embodiment.

FIG. 5 is an explanatory drawing of an example of a character region and a character background region according to the first embodiment. In the example illustrated in FIG. 5, the second division unit 13 divides the text containing region 106 into a character region 107 constituted by characters "STOP" and a character background region 108 resulting from excluding the character region 107 from the text containing region 106.

Specifically, the second division unit 13 binarizes and analyzes pixels constituting a text containing region, generates multiple connected components by connecting adjacent pixels having similar features, combines connected components that are arranged substantially in alignment according to the relative positions of the generated connected components and the similarities of the connected components, extracts lines constituting characters, and sets a region of the extracted lines to be a character region and a region in which no lines are extracted to be a character background region.

In a case where it is known that characters are written in a color darker than that of a character background, pixels to be connected are black pixels, and in a case where it is known that characters are written in a color lighter than that of a character background, pixels to be connected are white pixels. Furthermore, in a case where it is unknown whether a character is darker or lighter than a character background, when the number of white pixels is larger in pixels constituting a text containing region, characters can be determined to be written in a color darker than that of a character background and pixels to be connected are thus black pixels, and when the number of black pixels is larger in pixels constituting a text containing region, characters can be determined to be written in a color lighter than that of a character background and pixels to be connected are thus white pixels.

The technique for division into a character region and a character background region, however, is not limited to the technique described above, and other known techniques and the like may be used therefor. Note that the second division unit 13 devices a text containing region into a character region and a character background region, which is more advantageous than optical character recognition (OCR) or the like in that the processing load (the processing time and the amount of data necessary for processing, for example) can be reduced and in that division into a character region and a character background region can be performed independently of the language type.

The calculator 14 calculates a first representative value having a predetermined attribute of a character region resulting from the division by the second division unit 13, a second representative value having a predetermined attribute of a character background region resulting from the division by the second division unit 13, and a third representative value having a predetermined attribute of a background region resulting from the division by the first division unit 12.

The predetermined attribute may be any attribute that can express easiness of being perceived by a human, that is, an attribute that can express noticeability to human eyes or easiness of perception, and examples thereof include hue, brightness, and saturation. An example in which the predetermined attribute is hue will be described in the first embodiment, but the attribute is not limited thereto.

In addition, in the first embodiment, the first representative value is a representative color having a hue in a character region, which is, more specifically, a color that is the most salient in a character region. The second representative value is a representative color having a hue in a character background region, which is, more specifically, a color that is the most salient in a character background region. The third representative value is a representative color having a hue in a background region, which is, more specifically, a color that is the most salient in a background region.

In a character region, for example, a color that is the most salient can be the most common color in the character region. Alternatively, in a character region, for example, a saliency map of the character region is generated, and a color that is the most salient can be the color of the most salient pixels in the saliency map. The same applies to a character background region and a background region.

The saliency map is a map expressing the degree (probability) of noticeability of each pixel in a region, and can be generated in such a manner that a region is decomposed according to color, luminance, and edge, and differences between adjacent features of the respective components in multiscale images are calculated and integrated (for details, refer to L. Itti, C. Koch, and E. Niebur, "A model of saliency-based visual attention for rapid scene analysis," IEEE Trans. Pattern Anal. Mach. Intell., vol. 20, no. 11, pp. 1254-1259, 1998, for example).

The storage unit 15 stores a visual recognition distance table. FIG. 6 is a table illustrating an example of the visual recognition distance table according to the first embodiment. The visual recognition distance table illustrated in FIG. 6 is a table showing a visual recognition distance of each combination of the color of a pattern and the color of a background, which is based on a research by Oshima (1953). The visual recognition distance is a distance at which a pattern can be visually recognized. As the value of the visual recognition distance is larger, the color of a pattern is more noticeable relative to the color of a background and the pattern is more easily recognized by a human. Note that visual recognition distance table is not limited thereto.

The modification unit 16 modifies at least one of the first representative value, the second representative value, and the third representative value in such a way that a first difference based on the first representative value and the third representative value, a second difference based on the first representative value and the second representative value, and a third difference based on the second representative value and the third representative value, which are calculated by the calculator 14 become larger.

In the first embodiment, the predetermined attribute is hue as mentioned above. Furthermore, in the first embodiment, the first difference is a visual recognition distance when the first representative value is the color of a pattern (an example of an object) and the third representative value is the color of the background of the pattern, the second difference is a visual recognition distance when the first representative value is the color of a pattern and the second representative value is the color of the background of the pattern, and the third difference is a visual recognition distance when the second representative value is the color of a pattern and the third representative value is the color of the background of the pattern.

The modification unit 16 refers to the visual recognition distance table stored in the storage unit 15, and modifies at least one of the first representative value, the second representative value, and the third representative value in such a way that the first difference, the second difference, and the third difference become larger.

More specifically, the modification unit 16 refers to the visual recognition distance table illustrated in FIG. 6, and modifies the first representative value and the second representative value in such a way that the first difference is maximized, that the second difference and the third difference become larger, and further that the sum of the second difference and the third difference is maximized.

For example, it is assumed in the state illustrated in FIG. 5 that the first representative value of the character region 107 is "orange," the second representative value of the character background region 108 is "red," and the third representative value of the background region is "red."

In this case, the modification unit 16 first refers to the visual recognition distance table illustrated in FIG. 6, and modifies the first representative value in such a way that the first difference is maximized. As a result, the first representative value of the character region 107 is changed to "yellow."

Subsequently, the modification unit 16 refers to the visual recognition distance table illustrated in FIG. 6, and modifies the second representative value in such a way that the second difference and the third difference become larger and further that the sum of the second difference and the third difference is maximized. As a result, the second representative value of the character background region 108 is changed to "violet."

When the first representative value is modified by the modification unit 16, the output unit 17 outputs a modified image obtained by changing the value of the predetermined attribute of the character region to the modified first representative value; when the second representative value is modified by the modification unit 16, the output unit 17 outputs a modified image obtained by changing the value of the predetermined attribute of the character background region to the modified second representative value; and when the third representative value is modified by the modification unit 16, the output unit 17 outputs a modified image obtained by changing the value of the predetermined attribute of the background region to the modified third representative value. Specifically, the output unit 17 outputs a modified image for display onto the display unit 18.

Figure 7:
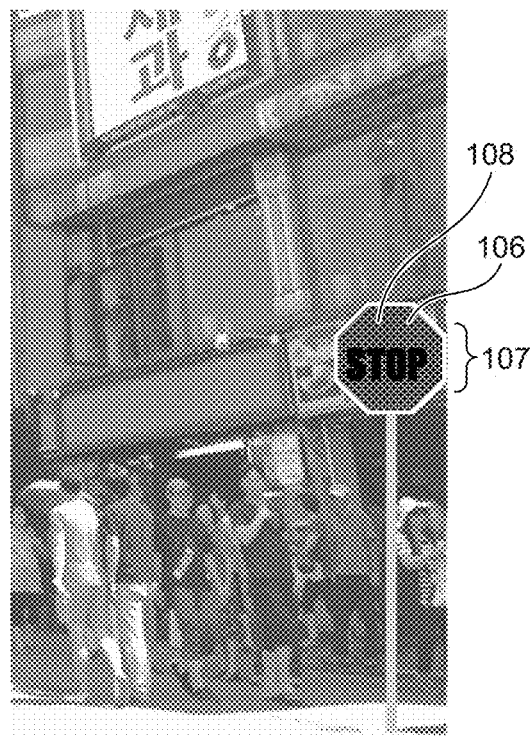
FIG. 7 is a drawing illustrating an example of a modified image according to the first embodiment.

In the example in which the visual recognition distance table illustrated in FIG. 6 is referred to, since the first representative value is modified from "orange" to "yellow" and the second representative value is changed from "red" to "violet" by the modification unit 16, the output unit 17 outputs a modified image, which is obtained by changing the color of the entire character region 107 to "yellow" and changing the color of the entire character background region 108 to "violet," for display onto the display unit 18 as illustrated in FIG. 7.

Figure 8:
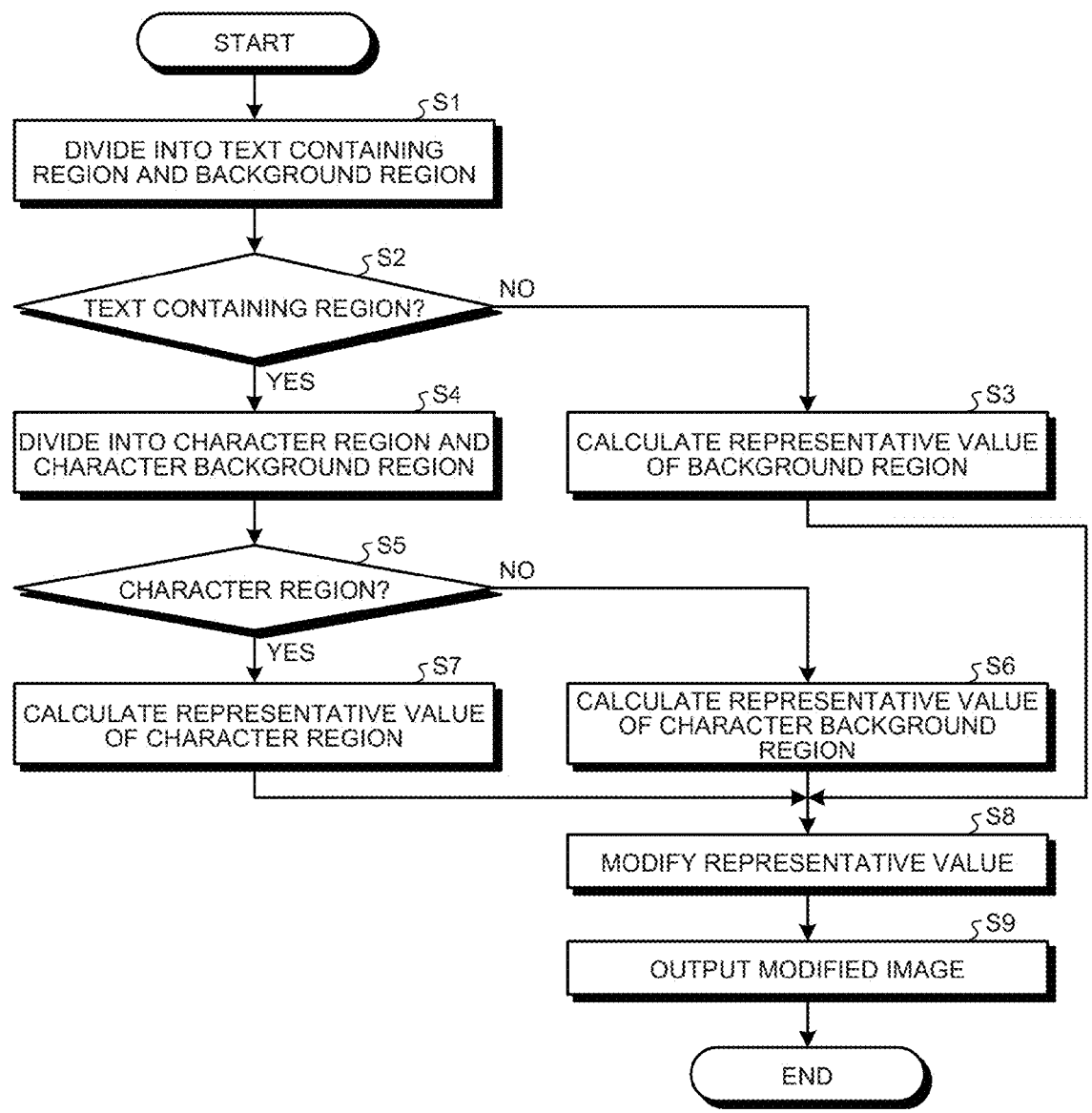
FIG. 8 is a flowchart illustrating example processing according to the first embodiment.

FIG. 8 is a flowchart illustrating an example of a flow of procedures of processing performed by the information processing device 10 according to the first embodiment.

First, the acquisition unit 11 acquires an image taken by the imaging unit 9, and the first division unit 12 divides the image acquired by the acquisition unit 11 into a text containing region and a background region (step S1).

Subsequently, for the text containing region (Yes in step S2), the second division unit 13 divides the text containing region into a character region and a character background region (step S4).

Subsequently, for the background region (No in step S2), the calculator 14 calculates the third representative value that is a representative value of the predetermined attribute of the background region (step S3); for the character background region (No in step S5), the calculator 14 calculates the second representative value that is a representative value of the predetermined attribute of the character background region (step S6); and for the character region (Yes in step S5), the calculator 14 calculates the first representative value that is a representative value of the predetermined attribute of the character region (step S7).

Subsequently, the modification unit 16 modifies at least one of the first representative value, the second representative value, and the third representative value in such a way that the first difference, the second difference, and the third difference become larger (step S8).

Subsequently, when the first representative value is modified by the modification unit 16, the output unit 17 outputs a modified image obtained by changing the value of the predetermined attribute of the character region to the modified first representative value; when the second representative value is modified by the modification unit 16, the output unit 17 outputs a modified image obtained by changing the value of the predetermined attribute of the character background region to the modified second representative value; and when the third representative value is modified by the modification unit 16, the output unit 17 outputs a modified image obtained by changing the value of the predetermined attribute of the background region to the modified third representative value (step S9).

As described above, according to the first embodiment, such modification that makes the differences in the attribute, which can express the easiness of recognition by a human, between the character region, the character background region, and the background region larger is made, which can quicken the user's recognition of characters in an image.

In particular, according to the first embodiment, since the color of the background region is not changed while the colors of the character region and the character background region are changed, the user's recognition of characters in an image can be quickened without changing the impression the user has on the original image.

Modified Example 1

In the first embodiment described above, the colors of the character region, the character background region, and the background region may be expressed in a L*a*b* color space (hereinafter referred to as a "Lab color space"), the predetermined attribute may be brightness in the Lab color space, the first representative value may be a representative value of the brightness in a character region, the second representative value may be a representative value of the brightness in a character background region, and the third representative value may be a representative value of the brightness in a background region.

For a character region, the first representative value can be a value of the brightness that is the most salient in the character region, that is, the most common brightness in the character region or the brightness of the most salient pixels in a saliency map of the character region. The same applies to a character background region and a background region.

In this case, the first difference is a difference (difference in brightness) between the first representative value and the third representative value, the second difference is a difference (difference in brightness) between the first representative value and the second representative value, and the third difference is a difference (difference in brightness) between the second representative value and the third representative value.

Note that the difference in brightness in the Lab color space can be obtained by an expression (1).

$$\Delta L = \sqrt{(L1-L2)^2} \qquad (1)$$

Thus, the calculator 14 may assign the first representative value to L1 and the third representative value to L2 of the expression (1) to obtain the first difference, may assign the first representative value to L1 and the second representative value to L2 of the expression (1) to obtain the second difference, and may assign the second representative value to L1 and the third representative value to L2 of the expression (1) to obtain the third difference.

When the first difference is represented by $\Delta L1$, the second difference is represented by $\Delta L2$, the third difference is represented by $\Delta L3$, the modified first difference is represented by $\Delta L1\_new$, the modified second difference is represented by $\Delta L2\_new$, and the modified third difference is represented by $\Delta L3\_new$, the modification unit 16 may modify any one value of the first representative value, the second representative value, and the third representative value in such a way that an expression (2) is satisfied.

$$\Delta L1\_new > \Delta L1 \text{ and } \Delta L2\_new > \Delta L2 \text{ and } \Delta L3\_new > \Delta L3 \qquad (2)$$

According to the modified example 1, such modification that makes the differences in brightness between the character region, the character background region, and the background region larger is made, which can quicken the user's recognition of characters in an image.

Modified Example 2

In the modified example 1, the saturation in the Lab color space may be added to the predetermined attribute, and a representative value of the saturation of the character region may further be added to the first representative value, a representative value of the saturation of the character background region may further be added to the second representative value, and a representative value of the saturation of the background region may further be added to the third representative value. Note that a representative value of saturation is expressed by a pair of an a value and a b value. Since the brightness has been described in the modified example 1, description on the brightness will not be repeated and description will be made particularly on the saturation in the modified example 2.

For a character region, a value of the most salient saturation in the character region is added to the first representative value. The value of the most salient saturation can be the most common saturation in the character region or the saturation of the most salient pixels in a saliency map of the character region. The same applies to a character background region and a background region.

In this case, the first difference is a difference (difference in brightness and saturation) between the first representative value and the third representative value, the second difference is a difference (difference in brightness and saturation) between the first representative value and the second representative value, and the third difference is a difference (difference in brightness and saturation) between the second representative value and the third representative value.

Note that, since the saturation in the Lab color space is defined by an expression (3), a difference in saturation in the Lab color space can be obtained by an expression (4).

$$C = \sqrt{a^2 + b^2} \qquad (3)$$

$$\Delta C = \sqrt{(a1-a2)^2 + (b1-b2)^2} \qquad (4)$$

Thus, the calculator 14 may assign the first representative value to a1 and b1 and the third representative value to a2 and b2 of the expression (4) to obtain the difference in saturation of the first difference, may assign the first representative value to a1 and b1 and the second representative value to a2 and b2 of the expression (4) to obtain the difference in saturation of the second difference, and may assign the second representative value to a1 and b1 and the third representative value to a2 and b2 of the expression (4) to obtain the difference in saturation of the third difference.

When the difference in saturation of the first difference is represented by $\Delta C1$, the difference in saturation of the second difference is represented by $\Delta C2$, and the difference in saturation of the third difference is represented by $\Delta C3$, the difference in saturation of the modified first difference is represented by $\Delta C1\_new$, the difference in saturation of the modified second difference is represented by $\Delta C2\_new$, and the difference in saturation of the modified third difference is represented by $\Delta C3\_new$, the modification unit 16 may modify any one value of the first representative value, the second representative value, and the third representative value in such a way that an expression (5) is satisfied.

$$\Delta C1\_new > \Delta C1 \text{ and } \Delta C2\_new > \Delta C2 \text{ and } \Delta C3\_new > \Delta C3 \qquad (5)$$

According to the modified example 2, such modification that makes the differences in brightness and saturation between the character region, the character background region, and the background region larger is made, which can quicken the user's recognition of characters in an image.

Although an example in which both of brightness and saturation in the Lab color space are used for the predetermined attribute is described in the modified example 2, only saturation may be used without use of brightness.

Modified Example 3

In the first embodiment described above, the colors of the character region, the character background region, and the background region may be expressed in a Lab color space, the predetermined attribute may be a color in the Lab color space, the first representative value may be a representative value of the color in a character region, the second representative value may be a representative value of the color in a character background region, and the third representative value may be a representative value of the color in a background region. Note that a representative value of color is expressed by a set of an L value, an a value and a b value.

For a character region, the first representative value can be a value of the color that is the most salient in the character region, that is, the most common color in the character region or the color of the most salient pixels in a saliency map of the character region. The same applies to a character background region and a background region.

In this case, the first difference is a difference (difference in color) between the first representative value and the third representative value, the second difference is a difference (difference in color) between the first representative value and the second representative value, and the third difference is a difference (difference in color) between the second representative value and the third representative value.

Note that the difference in color in the Lab color space can be obtained by an expression (6).

$$\Delta d = \sqrt{(L1-L2)^2 + (a1-a2)^2 + (b1-b2)^2} \qquad (6)$$

Thus, the calculator 14 may assign the first representative value to L1, a1, and b1 and the third representative value to L2, a2, and b2 of the expression (6) to obtain the first difference, may assign the first representative value to L1, a1, and b1 and the second representative value to L2, a2, and b2 of the expression (6) to obtain the second difference, and may assign the second representative value to L1, a1, and b1 and the third representative value to L2, a2, and b2 of the expression (6) to obtain the third difference.

When the first difference is represented by $\Delta d1$, the second difference is represented by $\Delta d2$, the third difference is represented by $\Delta d3$, the modified first difference is represented by Δd1_new, the modified second difference is represented by Δd2_new, and the modified third difference is represented by Δd3_new, the modification unit 16 may modify any one of the first representative value, the second representative value, and the third representative value in such a way that any one of the conditions below is satisfied.

Note that, since the Lab color space is an uniform color space, in which a color difference indicates the closeness of colors, a color combination with larger color difference is more easily recognized by a human. The modification unit 16 thus modifies the first representative value to a value of a color with a higher visual attraction. Examples of the color with a high visual attraction include safety colors provided in ISO 3864-1:2002 (Japanese industrial standards: JIS z 9101-2001).

Specifically, the modification unit 16 modifies the first representative value to a value of a color with which the difference between Δd1_new and Δd2_new is the largest of the values of the safety colors. In this case, the modification unit 16 modifies the first representative value in such a way that the values of Δd1_new and Δd2_new are 3 or larger.

Figure 9:
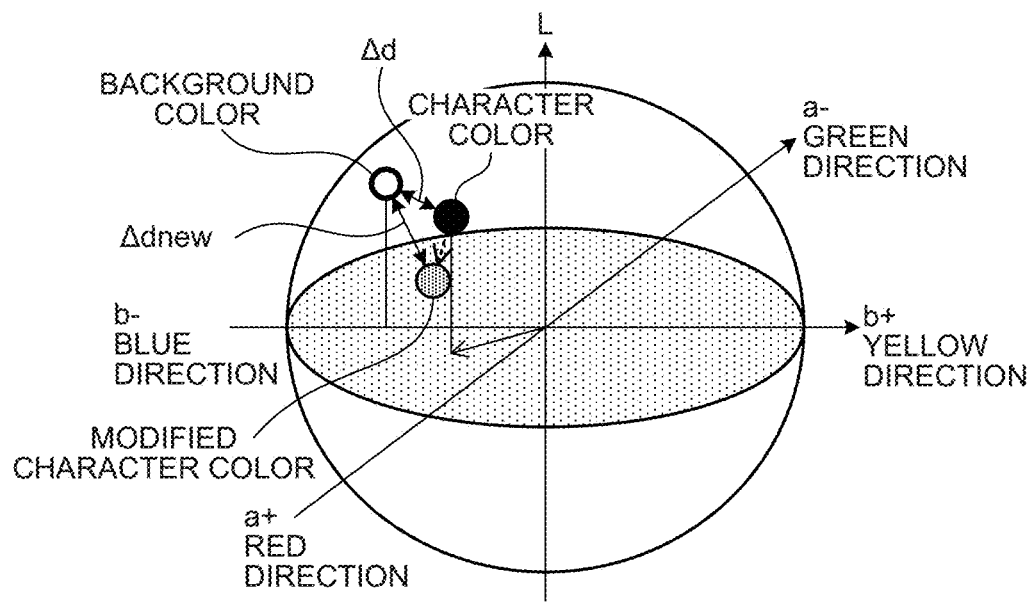
FIG. 9 is a diagram illustrating positions of a first representative value in a Lab color space before and after modification according to the first embodiment.
Figure 10:
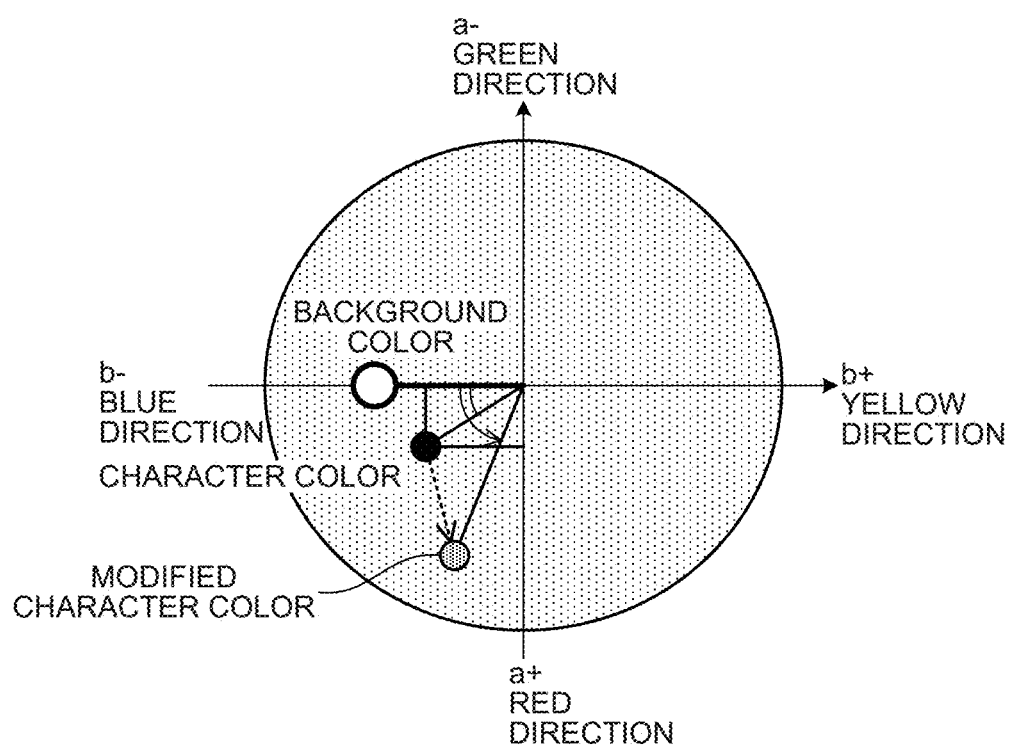
FIG. 10 is a diagram illustrating positions of the first representative value on an ab plane before and after modification according to the first embodiment

Alternatively, a color with a high visual attraction may be a warm color. In this case, the modification unit 16 modifies the a value and the b value of the first representative value in a positive direction (toward a warmer color) and in a manner that the absolute values of the a value and the b value of the first representative value become larger so as to modify the a value and the b value of the first representative value in such a way that the angle between the first representative value and the origin on the ab plane becomes larger as illustrated in FIGS. 9 and 10. Note that FIG. 9 is a diagram illustrating an example of positions of the first representative value in the Lab color space before and after modification according to the first embodiment, and FIG. 10 is a diagram illustrating an example of positions of the first representative value on the ab plane before and after modification according to the first embodiment.

According to the modified example 3, such modification that makes the difference in color between the character region and the character background region larger and that makes the difference in color between the character region and the background region larger is made, which can quicken the user's recognition of characters in an image.

Modified Example 4

In the first embodiment described above, the predetermined attribute may be the thickness of short sides of regions or lines contained in regions (hereinafter collectively referred to as the "thickness of lines"), the first representative value may be the thickness of lines in a character region, the second representative value may be the thickness of lines in a character background region, the third representative value may be the thickness of lines in a background region, and the first difference, the second difference, and the third difference may be differences in line thickness.

Second Embodiment

In a second embodiment, an example in which the significance of a text containing region is further used to determine whether a text containing region is to be treated as a text containing region or as a background region will be described. In the following, the difference from the first embodiment will be mainly described and components having similar functions as those in the first embodiment will be designated by the same names and reference numerals as those in the first embodiment, and the description thereof will not be repeated.

Figure 11:
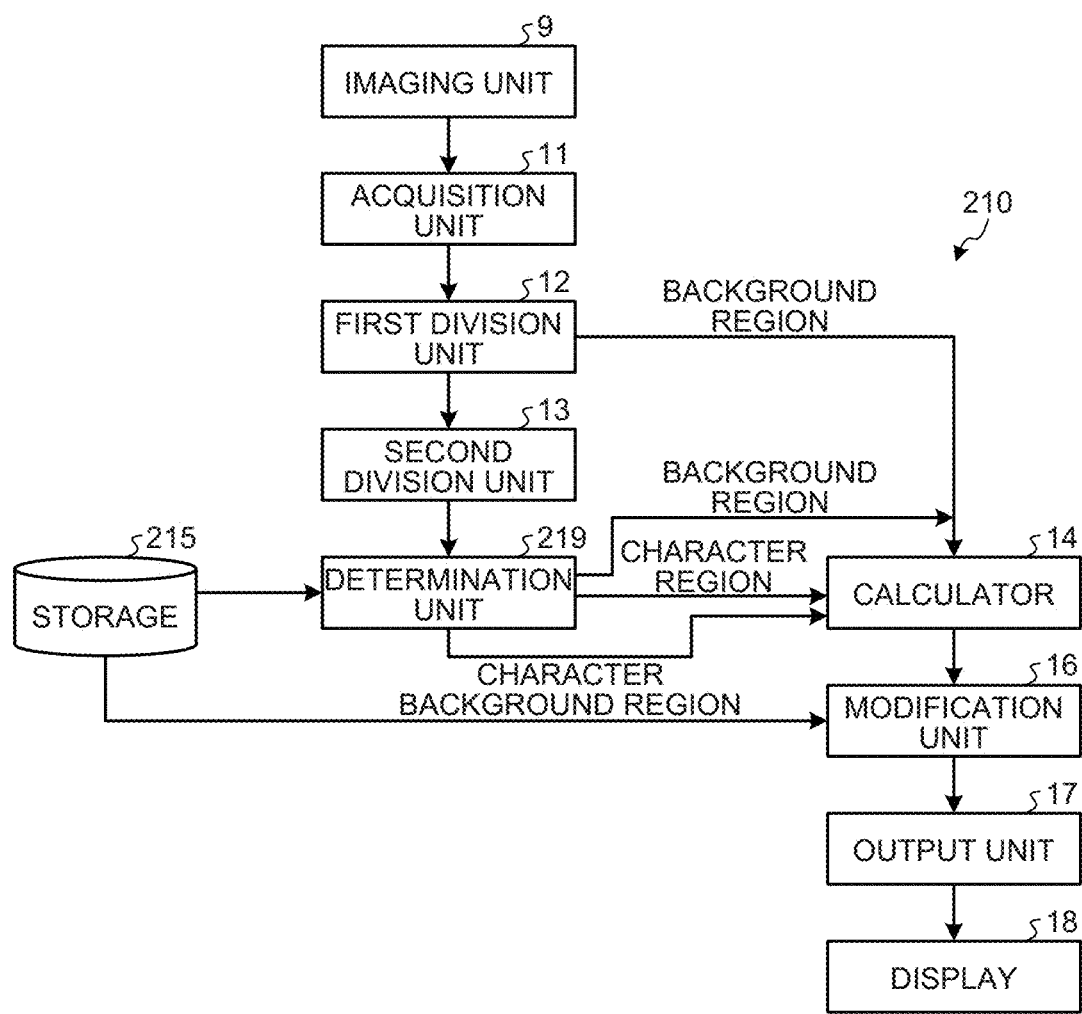
FIG. 11 is a configuration diagram illustrating an example of an information processing device according to a second embodiment.

FIG. 11 is a configuration diagram illustrating an example of an information processing device 210 according to the second embodiment. As illustrated in FIG. 11, the information processing device 210 according to the second embodiment differs from that of the first embodiment in a storage unit 215 and a determination unit 219.

In the second embodiment, it is assumed that multiple text containing regions are contained in an image acquired by the acquisition unit 11, that the first division unit 12 divides multiple text containing regions from the image, and that the second division unit 13 divides each of the text containing regions into a character region and a character background region.

The storage unit 215 further stores a safety color table defining safety colors provided in ISO 3864-1:2002.

The determination unit 219 determines the significance of each of the character regions resulting from the division by the second division unit 13, and determines a character region with a significance equal to or lower than a threshold and a character background region of this character region to be a background region. Specifically, the determination unit 219 uses the visual recognition distance table illustrated in FIG. 6 and the safety color table that are stored in the storage unit 215 to determine the significance of a character region.

For example, the determination unit 219 refers to the visual recognition distance table illustrated in FIG. 6, and determines that a character region is to be treated as a character region if the visual recognition distance of the character region exceeds a threshold for visual recognition distance, or determines that a character region and a character background region thereof are to be treated as a background region if the visual recognition distance of the character region is equal to or smaller than the threshold for visual recognition distance. In this case, the significance corresponds to the visual recognition distance.

Alternatively, for example, the determination unit 219 refers to the safety color table, and determines that a character region is to be treated as a character region if the character region contains a safety color, or determines that a character region and a character background region thereof are to be treated as a background region if the character region contains no safety color. In this case, the significance and the threshold correspond to the presence/absence of a safety color.

According to the second embodiment, in cases where multiple character regions are present, the user's recognition of characters in a character region with a high significance in an image can be quickened.

Modified Example 5

In the second embodiment described above, the determination unit 219 may determine that a character region is to be treated as a character region if the thickness of a line in the character region exceeds a threshold for line thickness, or may determine that a character region and a character background region thereof are to be treated as a background region if the thickness of a line in the character region is equal to or smaller than the threshold for line thickness. In this case, the significance corresponds to the line thickness.

Modified Example 6

In the second embodiment described above, the determination unit 219 may calculate a first principal direction component and a second principal direction component from multiple lines in a character region, and may determine that the character region is to be treated as a character region if the first principal direction component and the second principal direction component are not orthogonal to each other, or may determine that the character region and a character background region thereof are to be treated as a background region if the first principal direction component and the second principal direction component are orthogonal to each other. In this case, the significance and the threshold correspond to whether or not the first principal direction component and the second principal direction component are orthogonal to each other. Note that the first principal direction component is a direction component that is the most common of direction components of multiple lines in a character region, and that the second principal direction component is a direction component that is the second most common direction component of multiple lines in the character region.

According to the modified example 6, in cases where multiple character regions are present, the user's recognition of characters in an italic character region can be quickened.

Modified Example 7

In the second embodiment, the determination unit 219 may determine that a character region is to be treated as a character region if a line is contained in the periphery of a long side of a circumscribing rectangle of the character region, or may determine that a character region and a character background region thereof are to be treated as a background region if no line is contained in the periphery of a long side of a circumscribing rectangle of the character region. In this case, the significance and the threshold correspond to the presence/absence of a line in the periphery of a long side of a circumscribing rectangle of a character region.

For example, when an image illustrated in FIG. 12 is acquired by the acquisition unit 11, the determination unit 219 determines that a character region of a circumscribing rectangle 311 is to be treated as a character region since a line is contained in the periphery of a long side of the circumscribing rectangle 311, and determines that a character region of a circumscribing rectangle 312 and a character background region thereof are to be treated as a background region since no line is contained in the periphery of a long side of the circumscribing rectangle 312 as illustrated in FIG. 13.

Figure 14:
FIG. 14 is an explanatory diagram of the example of the technique for determining whether or not a line is contained in the periphery of a long side of a circumscribing rectangle of a character region according to the modified example 7.
Figure 15:
FIG. 15 is an explanatory diagram of the example of the technique for determining whether or not a line is contained in the periphery of a long side of a circumscribing rectangle of a character region according to the modified example 7.

Specifically, the determination unit 219 divides a circumscribing rectangle into three parts, which are an upper part, a middle part, and a lower part, and determines that a line is contained in the periphery of a long side of the circumscribing rectangle if a line that is twice or more of a short side of the circumscribing rectangle is present in the lower part. It is thus determined that a line is contained in the periphery of a long side of the circumscribing rectangle 311 as illustrated in FIG. 14 and that no line is contained in the periphery of a long side of the circumscribing rectangle 312 as illustrated in FIG. 15.

According to the modified example 7, in cases where multiple character regions are present, the user's recognition of characters in a character region in which an underline is used can be quickened.

Modified Example 8

In the second embodiment, the determination unit 219 may determine that a character region is to be treated as a character region if smaller-sized characters are contained in the periphery of a circumscribing rectangle of the character region, or may determine that a character region and a character background region thereof are to be treated as a background region if no smaller-sized characters are contained in the periphery of a circumscribing rectangle of the character region. In this case, the significance and the threshold correspond to the presence/absence of smaller-sized characters in the periphery of a circumscribing rectangle of a character region.

Figure 16:
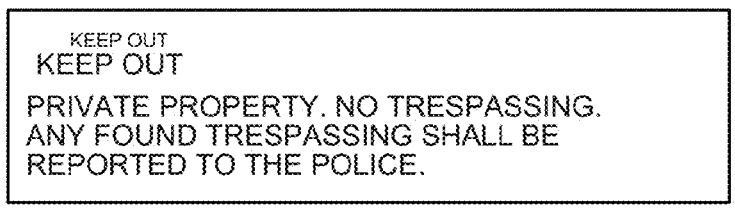
FIG. 16 is an explanatory diagram of an example of a technique for determining whether or not smaller-sized characters are contained in the periphery of a circumscribing rectangle of a character region according to a modified example 8.
Figure 17:
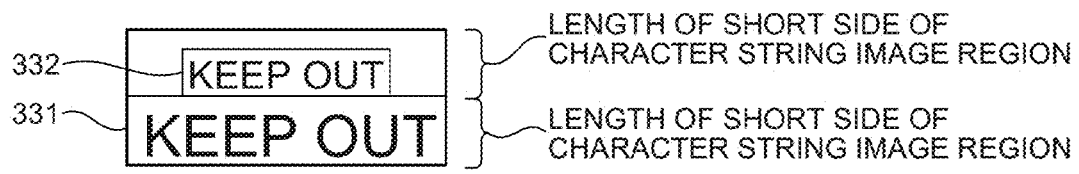
FIG. 17 is an explanatory diagram of the example of the technique for determining whether or not smaller-sized characters are contained in the periphery of a circumscribing rectangle of a character region according to the modified example 8.
Figure 18:
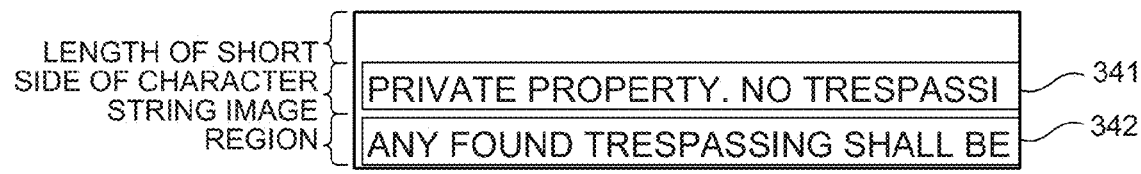
FIG. 18 is an explanatory diagram of the example of the technique for determining whether or not smaller-sized characters are contained in the periphery of a circumscribing rectangle of a character region according to the modified example 8.

For example, when an image illustrated in FIG. 16 is acquired by the acquisition unit 11, the determination unit 219 determines in an example illustrated in FIG. 17 that a character region of a circumscribing rectangle 331 is to be treated as a character region since a circumscribing rectangle 332 of smaller-sized characters is contained in the periphery of the circumscribing rectangle 331, or determines in an example illustrated in FIG. 18 that a character region of a circumscribing rectangle 341 and a character background region thereof are to be treated as a background region and that a character region of a circumscribing rectangle 342 and a character background region thereof are to be treated as a background region since no circumscribing rectangle of smaller-sized characters is contained in the peripheries of the circumscribing rectangles 341 and 342.

Specifically, the determination unit 219 sets a region having the same size as a circumscribing rectangle at the top of the circumscribing region, determines that smaller-sized characters are contained in the periphery of the circumscribing rectangle if a circumscribing rectangle having a short side having a length of ⅔ of that of the region or shorter is present in the region. It is thus determined that smaller-sized characters are present in the periphery of the circumscribing rectangle 331 as illustrated in FIG. 17, and that no small-sized characters are contained in the peripheries of the circumscribing rectangles 341 and 342 as illustrated in FIG. 18.

Third Embodiment

In a third embodiment, an example in which an image is acquired from outside and a modified image is output to the outside will be described. In the following, the difference from the first embodiment will be mainly described and components having similar functions as those in the first embodiment will be designated by the same names and reference numerals as those in the first embodiment, and the description thereof will not be repeated.

Figure 19:
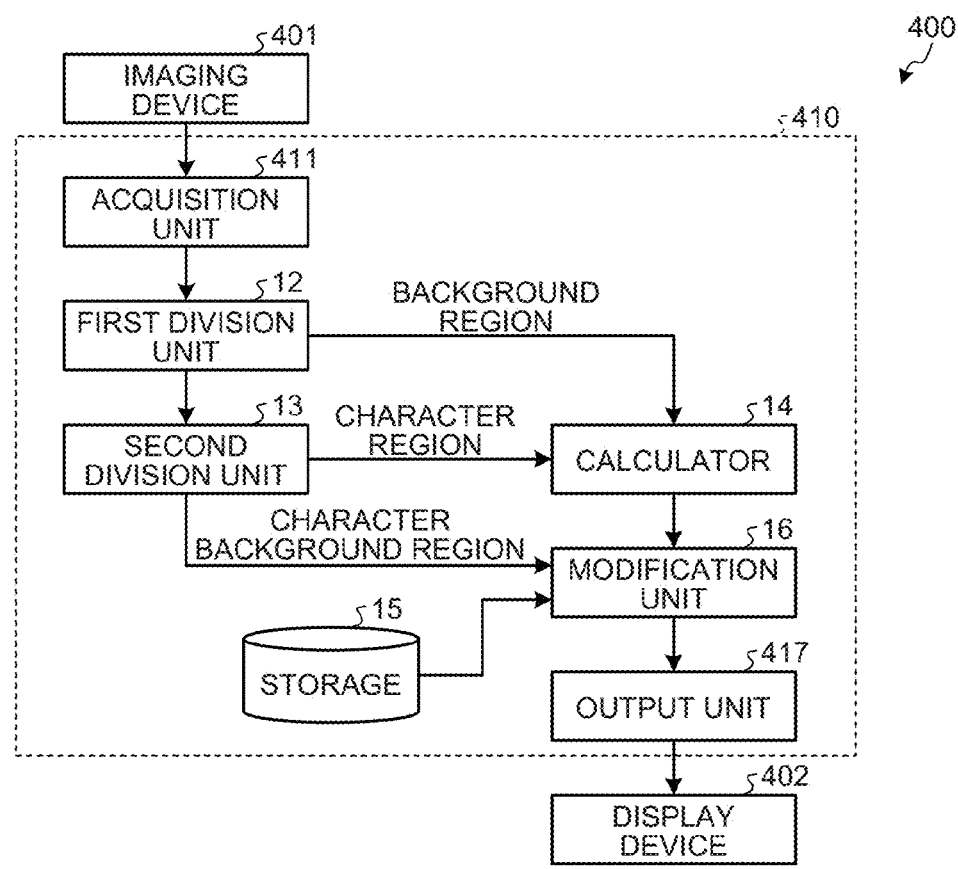
FIG. 19 is a configuration diagram illustrating an example of an information processing system according to a third embodiment.

FIG. 19 is a configuration diagram illustrating an example of an information processing system 400 according to the third embodiment. As illustrated in FIG. 19, the information processing system 400 includes an imaging device 401, an information processing device 410, and a display device 402.

Note that the information processing device 410 is connected to the imaging device 401 and the display device 402 via a network (not illustrated). Examples of the network include the Internet, a virtual private network (VPN), and a local area network (LAN).

The information processing device 410 is different from that of the first embodiment in that the imaging unit 9 and the display unit 18 is not included and in an acquisition unit 411 and an output unit 417.

The imaging device 401 is configured to take images, and can be constituted by an imager having a CCD or a CMOS, for example, as an image sensor.

The acquisition unit 411 acquires an image from the imaging device 401 via the network.

The output unit 417 outputs a modified image for display onto the display device 402 via the network.

The display device 402 is configured to display a modified image, and can be constituted by a display device such as a liquid crystal display or a touch panel display, for example.

Figure 20:
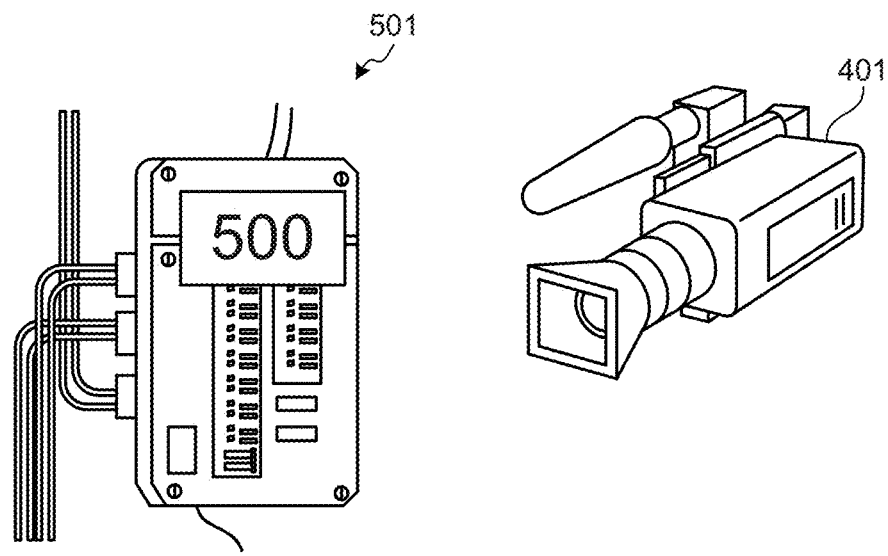
FIG. 20 is an explanatory diagram illustrating an example use of the information processing system according to the third embodiment.
Figure 21:
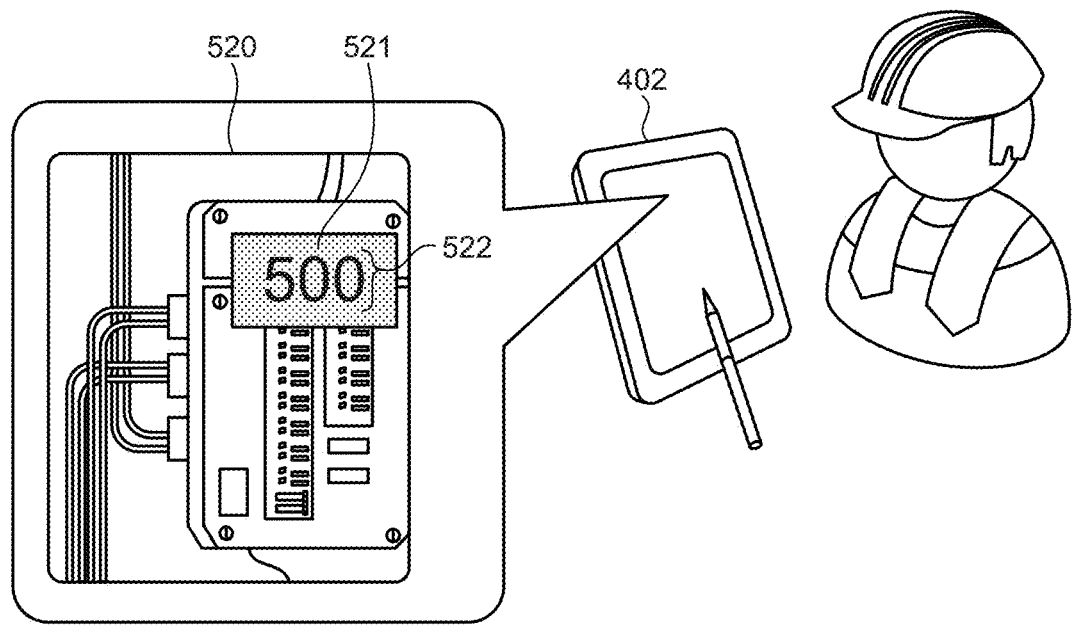
FIG. 21 is an explanatory diagram illustrating an example use of the information processing system according to the third embodiment.

According to the third embodiment, the information processing device 410 can acquire an image 501 taken by the imaging device 401 installed in a work site as illustrated in FIG. 20, generate a modified image by the technique described in the first embodiment, and display a modified image 520 obtained by modifying the colors of a character region 522 and a character background region 521 to the display device 402 of a worker as illustrated in FIG. 21.

As a result, an image containing a character region in an area out of the field of view of the user or an area with an obstruction between the area and the user can be presented to the user, and the user's recognition of characters in the image can be quickened.

In particular, for a user monitoring a remote place, the user's recognition of text information in the remote place can be quickened. For example, for a user monitoring numerical values of meters in remote places, the user's recognition of numerical values of the meters can be quickened.

Fourth Embodiment

In a fourth embodiment, an example in which acquired images are combined will be described. In the following, the difference from the third embodiment will be mainly described and components having similar functions as those in the third embodiment will be designated by the same names and reference numerals as those in the third embodiment, and the description thereof will not be repeated.

Figure 22:
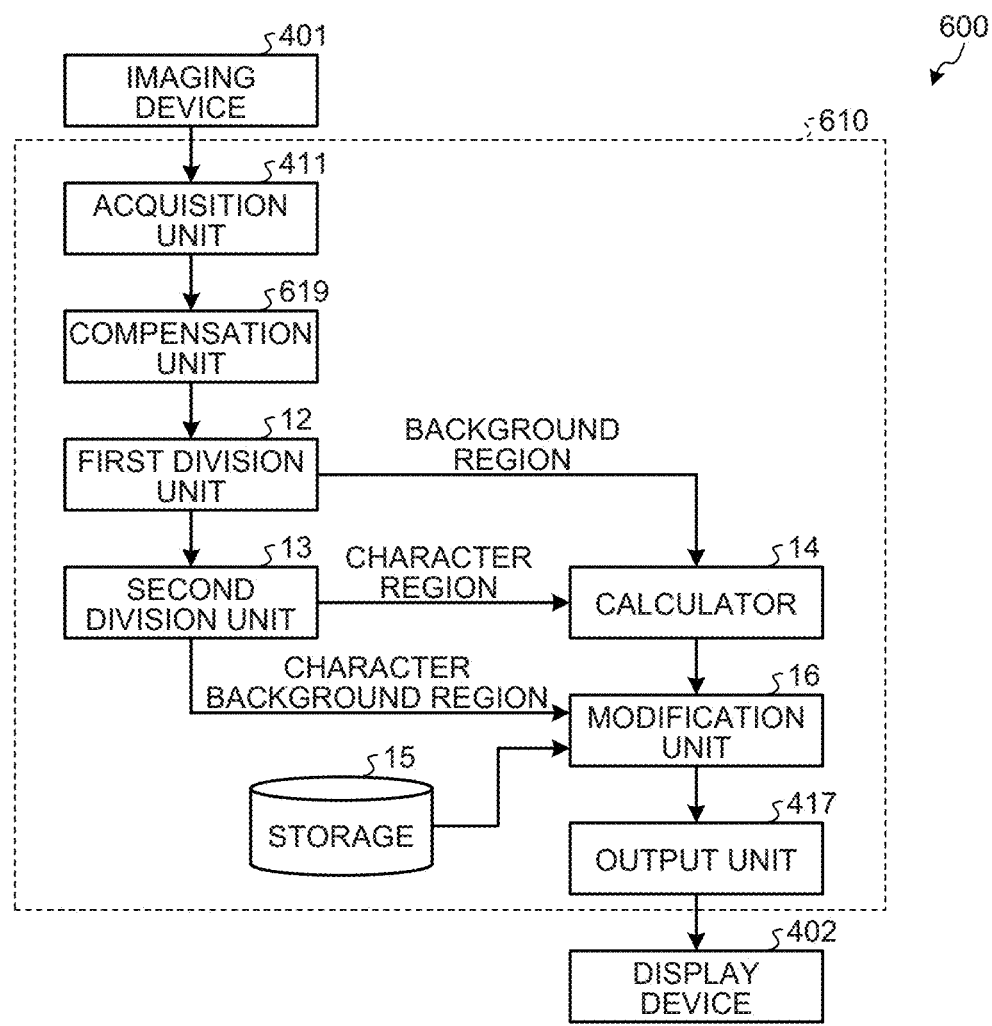
FIG. 22 is a configuration diagram illustrating an example of an information processing system according to a fourth embodiment.

FIG. 22 is a configuration diagram illustrating an example of an information processing system 600 according to the fourth embodiment. As illustrated in FIG. 22, the information processing system 600 differs from that of the third embodiment in that an information processing device 610 includes a compensation unit 619.

In the fourth embodiment, the acquisition unit 411 is configured to acquire multiple images taken at the same time.

Figure 23:
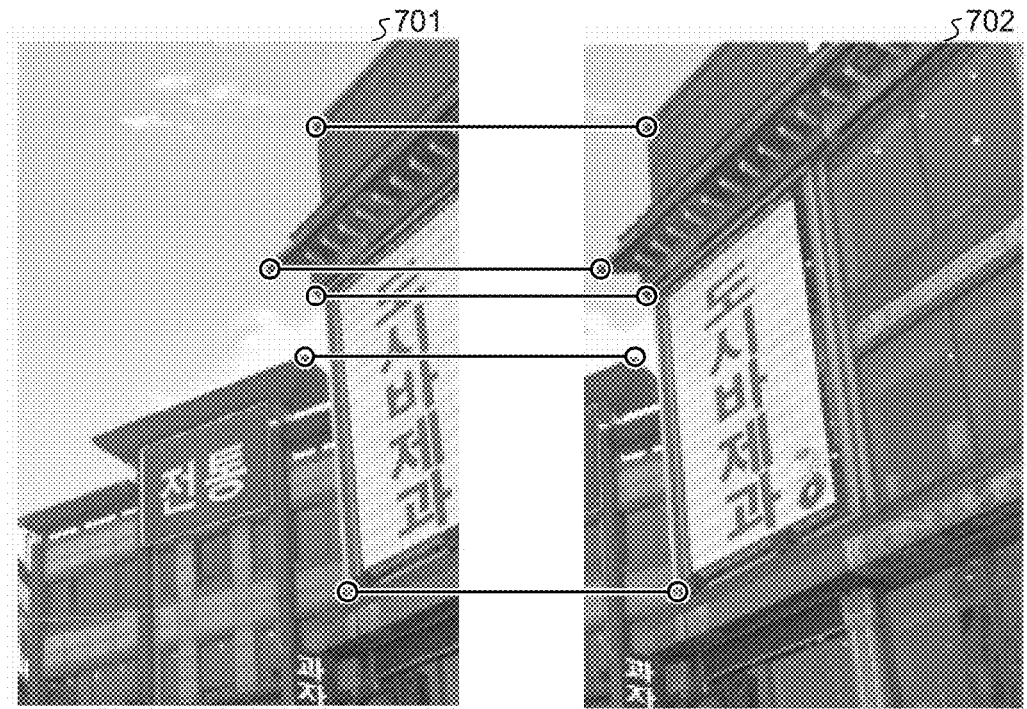
FIG. 23 is an explanatory drawing of an example of a combining technique according to the fourth embodiment.
Figure 24:
FIG. 24 is a drawing illustrating an example of a composite image according to the fourth embodiment.

The compensation unit 619 combines multiple images acquired by the acquisition unit 411. Specifically, the compensation unit 619 calculates local feature quantities that express regions of points having stable features that are not changed by rotation and scaling in images 701 and 702 acquired by the acquisition unit 411, and determines points that are most similar among the local feature quantities in the respective images are determined to be corresponding points as illustrated in FIG. 23. The compensation unit 619 then estimates the shift amount and the deformation amount between the two images from the multiple determined corresponding points, overlays the images on each other so that the corresponding points match each other according to the estimated shift amount and deformation amount, and corrects the images to obtained a composite image 703 as illustrated in FIG. 24.

Hardware Configuration

Figure 25:
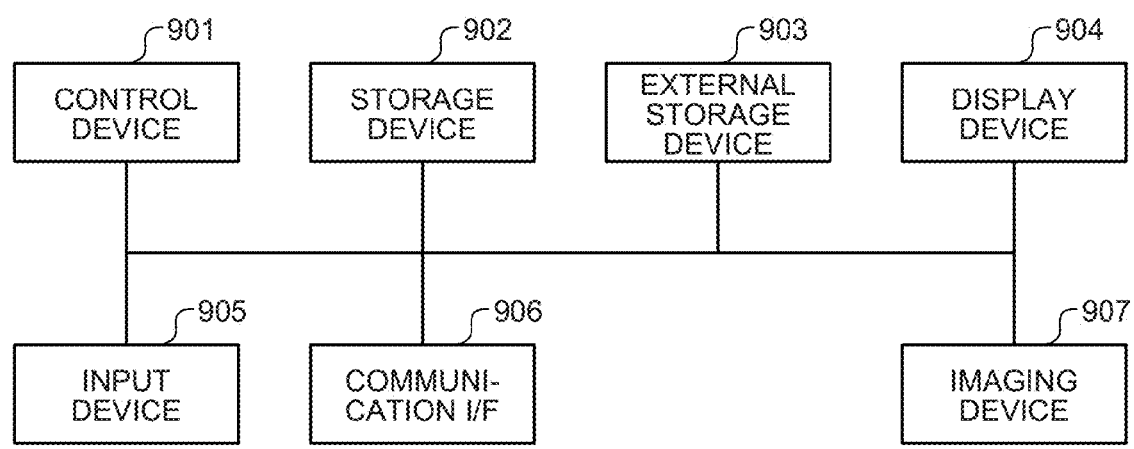
FIG. 25 is a block diagram illustrating an example hardware configuration of the information processing devices according to the embodiments and modified examples.

FIG. 25 is a block diagram illustrating an example of a hardware configuration of the information processing devices according to the embodiments and modified examples described above. As illustrated in FIG. 25, the information processing devices according to the embodiments and modified examples described above each include a control device 901 such as a CPU, a storage device 902 such as a ROM and a RAM, an external storage device 903 such as an HDD and an SSD, a display device 904 such as a display, an input device 905 such as a mouse and a keyboard, a communication interface (I/F) 906, and an imaging device 907 such as a camera, which can be achieved by a hardware configuration using a common computer system. The information processing devices according to the third and fourth embodiments, however, need not include the imaging device 907.

Programs to be executed by the information processing devices according to the embodiments and modified examples described above are embedded in a ROM or the like in advance and provided therefrom.

Alternatively, the programs to be executed by the information processing devices according to the embodiments and modified examples described above may be recorded on a computer readable storage medium such as a CD-ROM, a CD-R, a memory card, a DVD and a flexible disk (FD) in a form of a file that can be installed or executed, and provided therefrom.

Alternatively, the programs to be executed by the information processing devices according to the embodiments and modified examples described above may be stored on a computer system connected to a network such as the Internet, and provided by being downloaded via the network. Still alternatively, the programs to be executed by the information processing devices according to the embodiments and modified examples described above may be provided or distributed through a network such as the Internet.

The programs to be executed by the information processing devices according to the embodiments and modified examples described above have modular structures for implementing the units described above in a computer system. In an actual hardware configuration, for example, the control device 901 reads the programs from the external storage device 903 onto the storage device 902 and executes the programs, whereby the respective units are realized on a computer system.

As described above, according to the embodiments and modified examples, the user's recognition of characters in an image can be quickened.

For example, the steps in the flowcharts in the embodiments described above may be carried out in a different order, some of the steps may be carried out simultaneously, or the order in which the steps are carried out may be changed each time the steps are carried out.

Furthermore, for example, the second embodiment may be combined with the third embodiment or the fourth embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
   an acquisition unit to acquire an image;
   a first division unit to divide the image into a text containing region containing one or more characters and a background region other than the text containing region;
   a second division unit to divide the text containing region into a character region constituted by lines forming the characters and a character background region other than the character region;
   a calculator to calculate a first representative value of a predetermined attribute of the character region, a second representative value of the predetermined attribute of the character background region, and a third representative value of the predetermined attribute of the background region;
    a modification unit to modify at least one of the first representative value, the second representative value, and the third representative value in such a way that a first difference based on the first representative value and the third representative value, a second difference based on the first representative value and the second representative value, and a third difference based on the second representative value and the third representative value become larger; and
    an output unit to output a modified image obtained by
        changing the value of the predetermined attribute of the character region to a modified first representative value when the first representative value is modified,
        changing the value of the predetermined attribute of the character background region to a modified second representative value when the second representative value is modified, or
        changing the value of the predetermined attribute of the background region to a modified third representative value when the third representative value is modified.

2. The device according to claim 1, wherein the predetermined attribute is an attribute capable of expressing easiness of recognition by a human.

3. The device according to claim 2, wherein
the predetermined attribute is hue,
the first representative value is a representative color of a hue in the character region,
the second representative value is a representative color of a hue in the character background region,
the third representative value is a representative color of a hue in the background region,
the first difference is a visual recognition distance when the first representative value is a color of an object and the third representative value is a color of a background of the object,
the second difference is a visual recognition distance when the first representative value is a color of an object and the second representative value is a color of a background of the object, and
the third difference is a visual recognition distance when the second representative value is a color of an object and the third representative value is a color of a background of the object.

4. The device according to claim 3, wherein the modification unit further modifies the first representative value and the second representative value in such a way that a sum of the second difference and the third difference is maximized.

5. The device according to claim 2, wherein
the predetermined attribute is brightness, and
the first representative value is a representative value of a brightness in the character region,
the second representative value is a representative value of a brightness in the character background region,
the third representative value is a representative value of a brightness in the background region, and
the first difference, the second difference, and the third difference are differences in brightness.

6. The device according to claim 2, wherein
the predetermined attribute is saturation, and
the first representative value is a representative value of a saturation in the character region,
the second representative value is a representative value of a saturation in the character background region,
the third representative value is a representative value of a saturation in the background region, and
the first difference, the second difference, and the third difference are differences in saturation.

7. The device according to claim 2, wherein
the predetermined attribute is a color, and
the first representative value is a representative value of a color in the character region,
the second representative value is a representative value of a color in the character background region,
the third representative value is a representative value of a color in the background region, and
the first difference, the second difference, and the third difference are differences in color.

8. The device according to claim 1, wherein
the first division unit divides the image into multiple text containing regions and the background region, and
the second division unit divides each of the text containing regions into the character region and the character background region,
the information processing device further comprises a determination unit to determine significance of each of the character regions and determine a character region having a significance equal to or lower than a threshold and a character background region of the character region to be a background region.

9. The device according to claim 1, wherein the output unit outputs the modified image to a display unit for display.

10. The device according to claim 1, wherein the output unit outputs the modified image to an external device.

11. An image modification method comprising:
    acquiring an image;
    dividing the image into a text containing region containing one or more characters and a background region other than the text containing region;
    dividing the text containing region into a character region constituted by lines forming the characters and a character background region other than the character region;
    calculating a first representative value of a predetermined attribute of the character region, a second representative value of the predetermined attribute of the character background region, and a third representative value of the predetermined attribute of the background region;
    modifying at least one of the first representative value, the second representative value, and the third representative value in such a way that a first difference based on the first representative value and the third representative value, a second difference based on the first representative value and the second representative value, and a third difference based on the second representative value and the third representative value become larger; and
    outputting a modified image obtained by
        changing the value of the predetermined attribute of the character region to a modified first representative value when the first representative value is modified,
        changing the value of the predetermined attribute of the character background region to a modified second representative value when the second representative value is modified, or
        changing the value of the predetermined attribute of the background region to a modified third representative value when the third representative value is modified.

12. A computer program product comprising a non-transitory computer-readable medium containing programmed instructions, the instructions causing a computer to execute:
    acquiring an image;

dividing the image into a text containing region containing one or more characters and a background region other than the text containing region;

dividing the text containing region into a character region constituted by lines forming the characters and a character background region other than the character region;

calculating a first representative value of a predetermined attribute of the character region, a second representative value of the predetermined attribute of the character background region, and a third representative value of the predetermined attribute of the background region;

modifying at least one of the first representative value, the second representative value, and the third representative value in such a way that a first difference based on the first representative value and the third representative value, a second difference based on the first representative value and the second representative value, and a third difference based on the second representative value and the third representative value become larger; and outputting a modified image obtained by
- changing the value of the predetermined attribute of the character region to a modified first representative value when the first representative value is modified,
- changing the value of the predetermined attribute of the character background region to a modified second representative value when the second representative value is modified, or
- changing the value of the predetermined attribute of the background region to a modified third representative value when the third representative value is modified.

* * * * *